Sept. 13, 1960 V. K. DONEHUE Re. 24,869

VEHICLE FIRE EXTINGUISHER APPARATUS

Original Filed March 14, 1955 2 Sheets-Sheet 1

INVENTOR.

BY Val K. Donehue
A. Wilson Sturges
agent

VEHICLE FIRE EXTINGUISHER APPARATUS

Original Filed March 14, 1955 2 Sheets-Sheet 2

INVENTOR.

Val K. Donehue

BY A. William Sturges Agent

United States Patent Office

Re. 24,869
Reissued Sept. 13, 1960

24,869

VEHICLE FIRE EXTINGUISHER APPARATUS

Val K. Donehue, 3713 Laurel Ave., Omaha, Nebr.

Original No. 2,867,281, dated Jan. 6, 1959, Ser. No. 493,889, Mar. 14, 1955. Application for reissue Feb. 11, 1960, Ser. No. 8,206

8 Claims. (Cl. 169—2)

Matter enclosed in heavy brackets [ ] appears in the original patent but forms no part of this reissue specification; matter printed in italics indicates the additions made by reissue.

This invention relates to extinguishing fires in motor vehicles and fires of the type that commonly occur from defective wiring of the engine and from the bursting of a flat tire into flame due to over-heating. *A particular objective is to provide means for extinguishing fires in any vehicle of a type in which tire fires commonly occur, particularly vehicles carrying cargoes of explosive material.*

It is well known that ammunition trucks have exploded due to fires caused by either defective wiring or overheated tires, the fire reaching and igniting the explosive cargo. It has been the practice of the driver of the ammunition truck to stop the truck, jump out hurriedly and spray the tire or wiring with a small portable fire extinguisher, hoping to extinguish the fire before the truck and himself blow up, a dangerous race with death.

However, once a fire in a tire has burst into full flame it is difficult and almost impossible to stop it with the portable fire fighting equipment of the type now used on ammunition trucks. For example, 50-pound manually portable fire fighting units are commonly used on trucks and without certainty that these will put out a fire once fully started.

With portable equipment only there is a great possibility of the tire bursting into flame between the time the driver sees smoke in his rear view mirror and the time he reaches the fire, having stopped his truck and having rushed back to use a hand extinguisher, reaching the fire too late for effective use of hand equipment and after the flame has dangerously progressed beyond a stage controllable with hand equipment. When too late, the ammunition truck driver must either remove the burning tire or run from the truck as fast as he can before it explodes.

The key to my method and system lies in my perception of the importance of the fact that it is far easier to fight a tire fire before it bursts into flame and in my conception of making this possible with stationary equipment remotely controllable by the operator from the cab, and the conception that the desirability of a remote control system is not defeated by its inability to completely extinguish a tire fire whereby it is an object of this invention to provide a method including use of both remote control and hand operated extinguishers.

A further object of the invention is to provide means for delivering fire extinguishing material to a tire while a truck is in motion, the apparatus being of a nature such that its outlet parts will not clog with mud or ice and become inoperable.

More particularly it is an object of this invention to provide a tire fire extinguishing system the outlet members of which are disposed adjacent the tires, the outlet members being capped for preventing mud from entering the outlet opening thereof, and the pressure of the system being so great as to blow off the caps covering the outlet opening automatically with the turning on of the fire extinguishing system whereby the outlet openings are then open and free to deliver fire extinguishing material to a tire fire.

Other and further objects and advantages of the present invention will be apparent from the following detailed description, drawings and claims the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
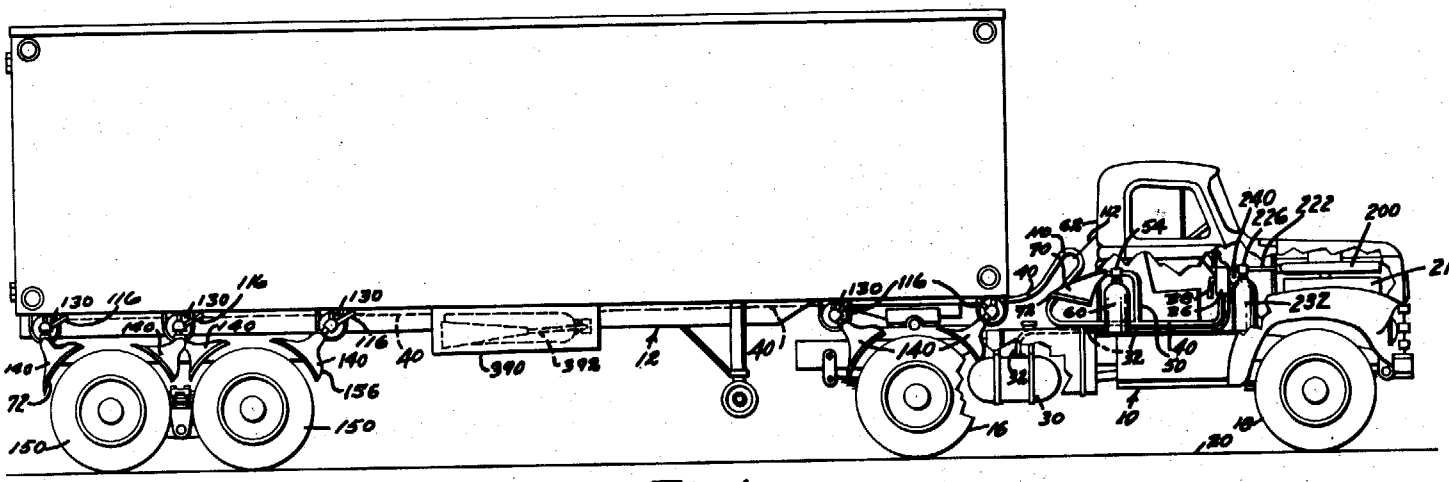
Figure 1 is a side elevation of a truck and semi-trailer provided with a fire extinguishing system of this invention mounted thereon, portions of the truck being broken away to show the system. A portable fire extinguisher being shown in dotted line.
Figure 3:
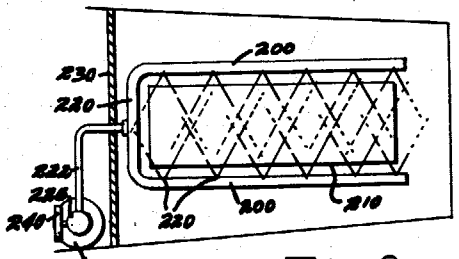
Figure 3 is a diagrammatic view of the motor area of the truck shown with upper portions of the hood and forward portions of the cab removed and with a fire wall between the motor area and the cab area being shown in cross-section.

The remote control fire extinguishing system of this invention is particularly adapted for use on trucks and by way of example a truck of a type having a semi-trailer is shown in Figure 1, the truck portion being generally indicated at 10 and the semi-trailer portion being generally indicated at 12.

The truck portion 10 can be of a type having many kinds of wheel arrangement and so the truck 10 that is shown serves only as an example. In the example shown, the truck 10 has two rear wheels on each side as indicated at 16, only one of which can be seen in Figure 1.

The truck 10 has two forward wheels 18, and the upper surface of the highway is indicated at 20.

In the preferred form of this invention, compressed air is used with the fire extinguishing system and a compressed air tank is shown at 30 in Figure 1, such air tanks being common equipment on trucks of this size.

A pipe line 32 leads upwardly from the top of the tank 30 in accordance with this invention and extends forwardly to a valve 36 having a control means of any suitable type such as a lever 38. The valve 36 is preferably disposed in a position such that a control 38 can be rapidly manipulated by the operator while sitting in his normal position while driving the truck. A second pipe 40 extends outwardly from the valve 36 and rearwardly therefrom, air pressure from the pipe 32 being communicated to the pipe 40 at times when the valve 36 is open. The pipe 40 extends rearwardly through the rearward end of the cab to the semi-trailer 12 although a pipe 50 extends upwardly from the pipe 40 and extends to a suitable fitting 54 at the top of a tank 60 disposed in the cab adjacent the rear wall 62 of the cab. A suitable outlet member 70 is disposed on the rearward side of the cab, the outlet member 70 opening downwardly and being connected at its upper end to the fitting 54. The purpose of the outlet member 70 is to distribute fire extinguishing material over the area immediately to the rear of a cab and between the cab and semi-trailer so as to extinguish fires breaking out in the gas tank area due to short-circuiting of wiring or other causes.

The outlet member 70 shown in Figure 1, is shown only by way of example and it will be understood that another type of outlet can be used if desired. The type shown at 70 in Figure 1 is outwardly flared on its lower end and rearward portions for purposes of distribution of the fire extinguishing material. The outlet 70 can be two in number, one on each side of the truck 10 as is preferable for best distribution of the fire extinguishing material, for this reason separate members 50, 54 and 60 can be disposed on the other side of the truck 10 in duplicate of the parts shown in Figure 1.

The outlet member 70 preferably has a cap 72 on the under side thereof which latter is adapted to be forced off by the air pressure in the lines 40 and 50. The cap 72 otherwise remains in place for purposes of preventing road dust and mud and ice from entering the outlet member 70 and clogging it up. The cap 72 will be more fully described during a description of a later described cap.

The pipe 40 preferably is flexible or otherwise at least a portion thereof extending from the rear of the cab 62 to the semi-trailer 12 is flexible preferably, and a considerable amount of slack is provided therein as best seen at 110 which can be upheld by a member 112.

Figure 2:
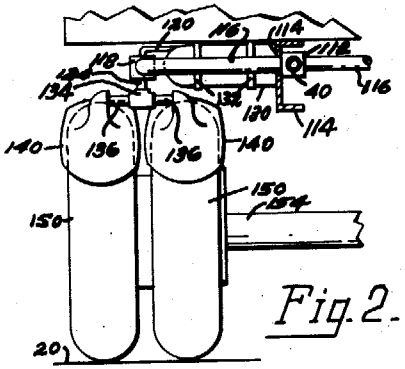
Figure 2 is a rear elevation of a truck as seen from the left hand side in Figure 1 and showing a left rear corner of the semi-trailer in an incomplete and diagrammatic representation, with portions of the semi-trailer being broken away and a frame member of the semi-trailer being shown in cross-section with the rearward portion removed.

The line 40 extends rearwardly along the semi-trailer 12 as best seen in Figure 2. At various points along the semi-trailer, the line 40 has a fitting 112 thereon for receiving pipes 116 which extend outwardly and transversely therefrom. The pipes 116 extend to the right and left hand sides of the semi-trailer 12 respectively and are disposed through the openings 114 in a trailer frame member 117. Through the pipes 116 air pressure extends outwardly to valves 118 which latter are of a type for actuation by the air pressure for opening the valves. When the valves 118 are open fire extinguishing material can flow therethrough through pipes 120 which are connected to the valves 118 and to fire extinguishing material reservoir tanks 130 supported on brackets 132 beneath the semi-trailer.

Fire extinguishing material passes through the lines 120 and the valves 118 and through a pipe 124 to a fitting 134 from which it extends outwardly through pipes 136 to the right and left joining outlet members 140 disposed above tires 150 which latter are arranged close together as dual wheels ordinarily having a common axle 154.

The outlet members 140 are preferably of a shape concave on their under side having a curvature approximately the same as a portion of a circle with a center at the axle of the respective wheel. The outlet members 140 have a sharper curve on those sides thereof which are disposed forwardly of a wheel. The purpose of a sharper curve, as is indicated at 156 is to counteract the tendency of wind caused by rotation of the wheel to carry the fire extinguishing material tangentially.

As thus described it will be seen that as shown in Figure 2 outlet members 140 are provided on the forward and rearward sides of each of the wheels 150 of the semi-trailer and also are arranged above the dual rearward wheels 16 of a tractor 10.

The motor area of the truck 10 is protected through the use of a right and left hand pair of pipes 200 disposed extending forwardly and horizontally along the top of each side of the motor 210. The pipes 200 are provided with apertures therein as indicated at 220 for permitting fire extinguishing material to spray outwardly therefrom and toward the motor 210.

The pipes 200 are connected to a pipe 220 which latter is itself connected by a pipe 222 which extends through a fire wall 230 of the tractor 10 to a valve 226 at the top of a fire extinguisher reservoir 232, the latter being one of the pressure type whereby when its valve wheel 240 is actuated manually by the operator of the truck, the valve 226 is opened whereby the fire extinguishing material flows therethrough and outwardly of the apertures 220 and sprays the motor 210. The pipe 200 can be upheld in any suitable manner, not shown.

Figure 4:
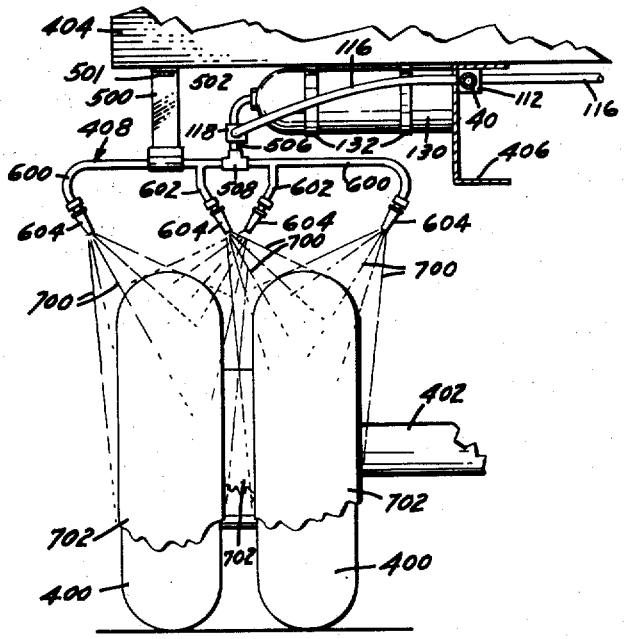
Figure 4 is a rear elevation of a rearward left hand corner of a semi-trailer as seen from the left hand in Figure 1, the view of Figure 4 being similar to the view of Figure 2 with the exception that it shows another modification of the invention.

In the modification shown in Figure 4, wherein is shown a view of the left hand rear wheels and end of a trailer in an incomplete and diagrammatic representation with portions of the semi-trailer being broken away and a frame member of the semi-trailer being shown in cross section with the rearward portion removed. The dual rear wheels are designated by the numeral 400 and are mounted on an axle 402. The semi-trailer body is shown at 404 having a frame member 406 therebeneath.

The truck-fire extinguishing system of the modification illustrated in Figure 4 is much the same as the above first described arrangement with the exception that the outlet members 140 are replaced with adjustable spray nozzle assemblies generally indicated by the numeral 408, the assembly 408 being secured to the under side of the trailer in position over the wheels 400 by means of a bracket 500 secured by a bolt 501.

The similar parts of the system shall bear the same numerals as first above described whereby the main air line 40 extends rearwardly of the trailer adjacent the frame channel 406 and at points along its extension is provided with fittings 112 thereon for receiving pipes 16 which extend outwardly and transversely therefrom. The pipes 116 extend to the right and left hand sides of the semi-trailer 404 respectively.

The pipes 40 and 116 carry air-pressure outwardly to valves 118 which latter are of a type for actuation by air pressure for opening the valves. When the valves 118 are opened fire extinguishing material can flow therethrough, through pipes 502 which are connected to the valves 118 and to fire extinguishing material reservoir tanks 130 supported on brackets 132 beneath the semi-trailer.

The fire extinguishing material passes through the lines 502 and valves 118 and through a pipe 506 to a fitting 508 from which extends outwardly through pipes 600 to the right and left. The outwardly, normally horizontally extending pipes 60 extend outwardly past the outer side of the tires 400, then curve downwardly and inwardly at an angle toward the center of the wheel 400.

Further outlet pipes 602 are provided connected to the main pipe 600, one on each side and a short distance outwardly of the fitting 508. Pipes 602 extend downwardly and are inclined at an angle inwardly and outwardly respectively, that is, the pipe 602 toward the outside of the trailer 404 is bent at an angle pointing toward the center of the inside one of the wheels 400. The inner pipe 602 or the pipe nearest the trailer frame member 406 is bent at an angle pointing toward the center of the outer one of the wheels 400.

Adjustable spray nozzles 604 are disposed one on each of the downwardly opening ends of the pipes 600 and 602.

When the system is in operation, as illustrated in Figure 4, air pressure released by turning the lever 38 of the valve 36 goes through the pipes 40 and 116 and actuates the valves 118 to an open position whereby fire extinguishing material can flow outwardly of the tank or reservoir 130, through the pipes 502 passing through the valve 118, and the pipe 506 and into the outlet pipes 600 and 602 and outwardly of the spray nozzle 604. The fire extinguishing material is illustrated by means of lines 700 and the nozzles 604 are so arranged as to cause the material 700 to cover a substantial area of the upper sides of the wheels or tires 400 with an airtight film 702 of extinguishing material 700.

Figure 5:
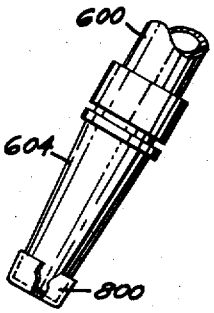
Figure 5 is a rear elevation of a nozzle shown in detail with the cap portion thereon being broken away.

To prevent the nozzle openings from being plugged with mud, snow, dirt or the like while the semi-trailer is in operation, the openings of the nozzles 604 are provided with caps 800 as best seen in Figure 5. The cap 800 fits closely around the lower open end of the nozzle 604 and the cap means is so designed that the pressure of fire extinguishing material coming through the outlet means or nozzle 604 will force the cap away from the outlet sufficiently to permit passage of the fire extinguishing material therethrough.

Figure 6:
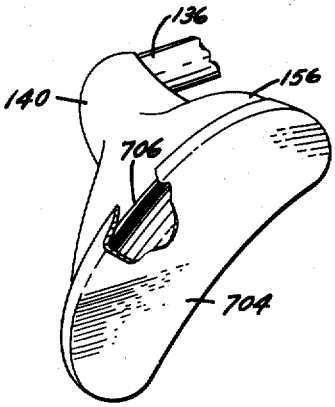
Figure 6 is a perspective view showing an outwardly flared fire extinguishing outlet member with a portion of a cap thereon being partially broken away.

Figure 6 shows cap means 704 as applied to the outlet members 140 and the caps 704 are shaped complementally to and engage about the lower terminal edges 706 of the opening of the outlet member 140.

From the foregoing description, it is thought to be obvious that a vehicle fire extinguisher apparatus constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In combination: [an ammunition carrying truck] *a vehicle carrying explosive material* having dual wheel assemblies and apparatus for fighting fires breaking out in a tire of a dual wheel assembly comprising: outlet means for fire extinguishing material disposed adjacent said tires and directed toward said tires, means controllable from a position adjacent the driver's seat of said [motor] vehicle for delivering fire extinguishing material to said outlet means whereby the operator can cause delivery of fire extinguishing material to said tires at times when said vehicle is in motion to prevent excess spreading of a tire fire until said vehicle can be stopped.

2. The fire extinguishing apparatus described in claim 1 in which said [motor] vehicle has a source of compressed air, and in which means is provided for using compressed air from said source to provide pressure for the delivery of fire extinguishing material to said outlet means.

3. The apparatus described in claim 1 in which said outlet means comprises a plurality of nozzles having outlet ends so constructed as to distribute said fire extinguishing material over a wide area.

4. The apparatus described in claim 1 in which cap means are provided for covering the terminal ends of said outlet means in order to prevent said terminal ends from becoming clogged with mut or the like, means for holding said cap means on said terminal ends respectively.

5. In combination: a [highway traveling] vehicle carrying an explosive cargo and having pneumatic tires on a dual wheel assembly and an apparatus for fighting a fire breaking out in a tire of a dual wheel assembly comprising: means mounted on said vehicle and providing a source of supply of fire extinguishing material under pressure, nozzles disposed in positions for directing fire extinguishing material at those parts of said tires which are disposed closest to the explosive cargo, means mounting said nozzles on said vehicle in said positions, means interconnecting said source and said nozzles and for piping said material from said source to said nozzles, controllable valve means in said piping means, and manually operable means mounted on said vehicle for controlling operation of said valve means from a position sufficiently remote from said tires that the operator is not in danger of being burned by said tire fire itself whereby fire extinguishing material can be delivered to said tires to control said fire in order to remove danger of explosion of said cargo for at least a sufficient time to permit the driver of said vehicle to fight said fire with other means.

6. The fire extinguishing apparatus described in claim 5 in which said [motor] vehicle has a source of compressed air, and in which means is provided for delivering compressed air from said source to said source of supply of fire extinguishing material to provide said pressure.

*7. A wheeled vehicle of a type having tires which are susceptible to breaking into flame from overheating, and apparatus for fighting fires breaking out in a tire of said vehicle comprising outlet means for fire extinguishing material disposed adjacent said tires and directed toward said tires, manually controllable means mounted on said vehicle and controllable from a position sufficiently remote from said tire fire that an operator of said manually controllable means would not be burned by said fire during manipulation of said manually controllable means, said manually controllable means being for delivering fire extinguishing material to said outlet means whereby an operator can cause delivery of said fire extinguishing material to said tires at times when said vehicle is in motion and to prevent excess spreading of a tire fire until said vehicle can be stopped.*

*8. A wheeled vehicle of a type having tires which are susceptible to breaking into flame from overheating, and apparatus for fighting fires breaking out in a tire of said vehicle comprising outlet means for fire extinguishing material disposed adjacent said tires and directed toward said tires, means mounted on said vehicle for delivering fire extinguishing liquid material to said outlet means while said vehicle is in motion.*

References Cited in the file of this patent or the original patent

UNITED STATES PATENTS

| | | |
|---|---|---|
| 1,130,719 | Erwin | Mar. 9, 1915 |
| 1,488,289 | Ruff | Mar. 5, 1924 |
| 1,493,327 | Dunbar | May 6, 1924 |
| 1,720,140 | O'Connor | July 9, 1929 |